United States Patent [19]

Buszek

[11] 4,150,639
[45] Apr. 24, 1979

[54] GASOLINE ENGINE FUEL SAVER

[76] Inventor: Frank J. Buszek, 19626 Woodmont, Harper Woods, Mich. 48225

[21] Appl. No.: 836,547

[22] Filed: Sep. 26, 1977

[51] Int. Cl.² .............................................. F02D 19/00
[52] U.S. Cl. ................................. 123/25 B; 123/25 L; 123/25 P
[58] Field of Search ................. 123/25 B, 25 R, 25 A, 123/25 E, 25 L, 25 P; 261/18 A

[56] References Cited

U.S. PATENT DOCUMENTS

| | | | |
|---|---|---|---|
| 3,716,040 | 2/1973 | Herpin | 123/25 R |
| 3,749,376 | 7/1973 | Alm et al. | 123/25 E |

*Primary Examiner*—Ira S. Lazarus
*Attorney, Agent, or Firm*—Willis Bugbee

[57] ABSTRACT

Water from a tank is drawn upward by suction created by the vacuum in the carburetor air cleaner or in the engine intake manifold through a filter containing synthetic sponge material sandwiched between upper and lower layers of glass wool, where it passes through a heat exchanger coil which is heated by being positioned adjacent the exhaust manifold of an internal combustion engine. There it is vaporized into steam and then passes either through an inlet port into the base of the engine carburetor or directly into the intake manifold. The steam thus produced expands and mixes with and vaporizes the unvaporized droplets of gasoline in the gasoline vapor, breaking up these droplets into gasoline vapor before they can enter the intake manifold.

2 Claims, 3 Drawing Figures

GASOLINE ENGINE FUEL SAVER

SUMMARY OF THE INVENTION

The invention resides principally in the use of engine-produced vacuum to withdraw water from a water tank by suction through a filter and thence through a heat exchanger coil adjacent the exhaust manifold, which coil vaporizes the water into steam. This steam is discharged through an outlet pipe into the carburetor base where it breaks up unvaporized gasoline droplets into gasoline vapor which mixes with the already vaporized gasoline, all of which thence passes through the intake manifold into the combustion chambers of the engine.

Figure 1:
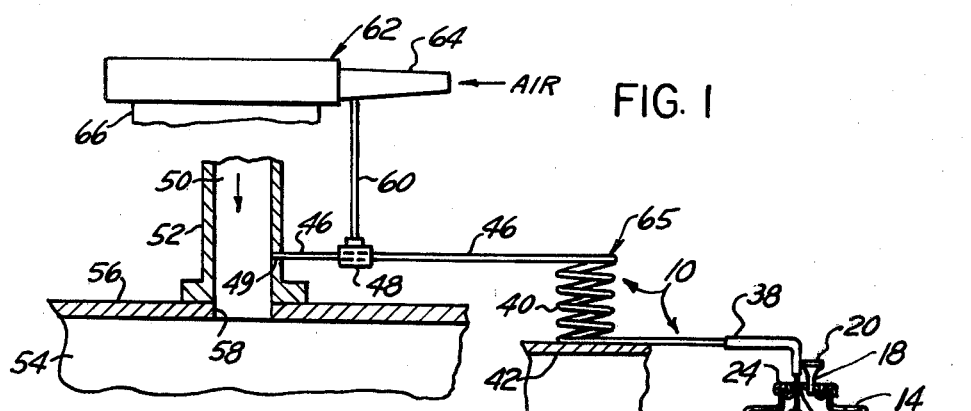
FIG. 1 is a diagrammatic side elevation, partly in section, showing a preferred form of the gasoline engine fuel saver of this invention as applied to the base of a conventional carburetor, where it acts in response to suction created in the conventional carburetor air cleaner.
Figure 2:
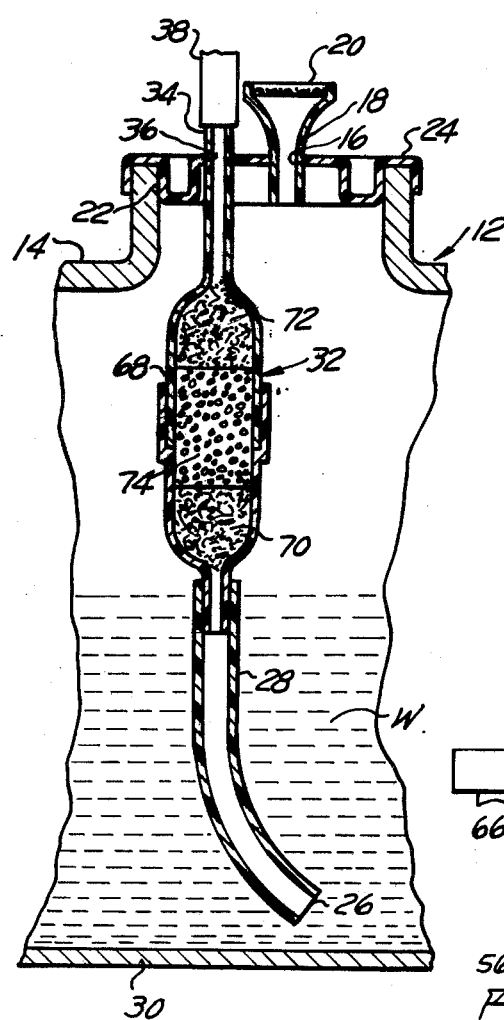
FIG. 2 is an enlarged central vertical section through the water tank and water filter shown in the lower right-hand corner of FIG. 1.

Referring to the drawing in detail, FIG. 1 shows a gasoline engine fuel saver, generally designated 10, according to a preferred form of the invention as including a water tank 12 having at the top wall 14 thereof an air inlet port 16 connected to an air inlet pipe 18 at the upper end of which is a breather screen 20. The top wall 14 of the water tank 12 also contains a filling port 22 closed by a suitable closure cap 24, preferably of resilient material, such as rubber, which is concentrically ribbed (FIG. 2) to fit different sizes of the port 22. A sponge 25, preferably of synthetic material, floats on top of the water W and retains and exudes moisture after the water W has otherwise been used up.

Figure 3:
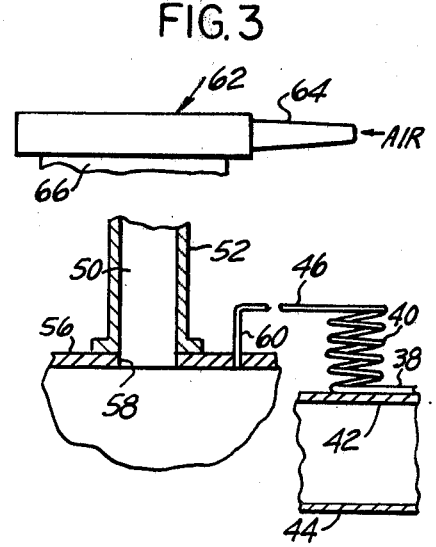
FIG. 3 is a view similar to the left-hand portion of FIG. 1, but showing the suction pipe connected directly to the engine intake manifold as a source of suction.

Submerged in the water W near the bottom of the tank 12 is the inlet port 26 of an unfiltered water supply line 28 leading upward from adjacent the bottom wall 30 of the tank 12 to a water filter 32 whence a filtered water outlet pipe 34 leads through a top wall port 36 to the inlet pipe 38 of a convoluted tubular member or helical heat exchanger coil 40 of suitable heat conducting material, such as copper. The coil 40 rests upon a wall 42 of the exhaust manifold 44 of a conventional internal combustion engine (not shown). From the heat exchanger coil 40 an outlet pipe 46 leads by way of a tee-fitting 48 through a water vapor discharge port 49 into the outlet passageway 50 of the tubular base 52 of the conventional engine carburetor (not shown). The passageway 50 in turn leads into the intake manifold passageway 54 of the conventional intake manifold 56 of the engine, through a port 58. From the tee-fitting 48 a vacuum supply pipe 60 leads upward to a vacuum or suction supply source such as the conventional carburetor air cleaner 62 into which unfiltered air enters through an inlet duct 64 and filtered air flows downward to the carburetor through a filtered air outlet duct 66. The air cleaner 62 is conventional and forms no part of the present invention beyond supplying a source of suction for the vacuum supply pipe 60. Alternatively, the vacuum supply pipe 60 may lead directly into the intake manifold 56 (FIG. 3). The pipe 28, water filter 32, pipes 34 and 38, heat exchanger coil 40 and pipe 46 collectively constitute a water vapor supply conduit, generally designated 65.

The water filter 32 consists of a hollow elongated bulb or casing 68 having in its upper and lower portions spaced bodies of porous ceramic material, such as glass wool 70 and 72 respectively separated from one another by an intermediate synthetic sponge body 74. The glass wool body 70 intercepts large foreign particles carried upward by water W in the tube 28, whereas the intermediate synthetic sponge body 74 filters out the smaller particles thereof, and the upper glass wool body 72 filters out particles of the synthetic sponge body 74 which may have detached themselves therefrom. Synthetic sponge is preferred for the intermediate body 74 instead of marine sponge, which was found to deteriorate faster in actual use.

Prior to the operation of the fuel saver 10 of the invention, after removing the threaded plug 24 from the filling port 22, the tank 12 is filled with water W to which in winter denatured alcohol has been added in sufficient quanity as an anti-freeze agent to prevent freezing in cold weather. The percentage of denatured alcohol required of course depends on the climate of the particular geographic area as governing the lower temperatures ordinarily encountered in that area, and is easily obtained from conventional published tables giving such percentages. The engine (not shown) is then started by operating the conventional electric starting motor and at the same time energizing the conventional ignition system.

In the operation of the fuel saver 10 of this invention, the suction produced by the reciprocating pistons in the engine cylinders creates a vacuum in the intake manifold passageway 54, the carburetor outlet passageway 50 and the carburetor air cleaner 62. This action creates a suction in the vacuum supply pipe 60 and thence creates suctions in the outlet pipe 46, the heat exchanger 40, the filtered water outlet pipe 34 and heat exchanger inlet pipe 38, thereby drawing water W from the tank 12 upward through the unfiltered water supply pipe 28 and thence through the filter bodies 70, 72 and 74. This filtered water passes upward through the filtered water outlet pipe 34, the heat exchanger inlet pipe 38, and the heat exchanger 40, where heat from the exhaust manifold 44 converts the water to water vapor such as steam and the alcohol, if present, to alcohol vapor. These vapors pass through the heat exchanger outlet pipe 46 and tee-fitting 48 and port 49 into the carburetor outlet passageway 50, where they are drawn into and flow along with the downwardly-descending stream of gasoline vapor, aided by the venturi effect of the latter as it flows past the port 49. The hot water vapor such as steam emerging from the port 49 encounters the gasoline vapor and raw gasoline droplets therein, converting the latter into gasoline vapor.

The combined vapors flow through the port 58 into the passageway 54 of the intake manifold 56 and thence in the usual way into the combustion chambers of the engine (not shown), where the electrical ignition sparks explode the vapor mixture and create the power of the engine. Experimental tests performed with the fuel saver 10 of the present invention when operated in actual use in an automobile have shown a substantial increase in gasoline mileage obtained from the use of the fuel saver 10 as well as substantial reduction in undesired exhaust emissions. The alcohol which has been mixed with the steam and vaporized is of course also combustible and adds to the explosive force of the gasoline vapor in the engine cylinders.

I claim:

1. A fuel saver for a gasoline-fueled internal combustion engine having a vacuum supply source such as an air cleaner, an intake manifold, an exhaust manifold, and a carburetor with a gasoline vapor outlet duct discharging gasoline vapor into said intake manifold, said fuel saver comprising a water container having a lower portion adapted to hold a supply of water and an upper portion having a water filling connection therein, a water vapor supply conduit having an inlet disposed below the intended water level in said water container and an outlet adapted to extend into the gasoline vapor outlet duct of the carburetor, and a vacuum supply conduit connected to said water vapor supply conduit and adapted to be connected to the vacuum supply source of the engine, said water vapor supply conduit including a heat exchanger adapted to be disposed adjacent the engine exhaust manifold in heat-receiving relationship therewith, said water vapor supply conduit including a water filter connected in series therewith and disposed within said water container, said water filter including a filter casing connected to and depending from said upper portion of said water container, and a mass of porous filter material disposed within said casing.

2. A fuel saver, according to claim 1, wherein said water filling connection has a closure member disposed in closing relationship thereto and wherein said filter casing is connected to and depends from said closure member.

* * * * *